(12) United States Patent
Sato (10) Patent No.: US 8,626,782 B2
(45) Date of Patent: Jan. 7, 2014

(54) PATTERN IDENTIFICATION APPARATUS AND CONTROL METHOD THEREOF

(75) Inventor: Hiroshi Sato, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 51 days.

(21) Appl. No.: 12/986,051

(22) Filed: Jan. 6, 2011

(65) Prior Publication Data

US 2011/0179052 A1 Jul. 21, 2011

(30) Foreign Application Priority Data

Jan. 15, 2010 (JP) ................... 2010-007445

(51) Int. Cl.
*G06F 7/00* (2006.01)
*G06F 17/30* (2006.01)
*G06F 13/14* (2006.01)

(52) U.S. Cl.
USPC ........................................... 707/758

(58) Field of Classification Search
USPC ......... 382/145, 190, 103, 115–128, 218, 154, 382/170, 224–227; 707/758; 345/589, 619; 358/538; 711/130; 718/100
See application file for complete search history.

(56) References Cited

U.S. PATENT DOCUMENTS

| | | | |
|---|---|---|---|
| 5,760,346 | A | 6/1998 | Kobayashi et al. |
| 5,761,087 | A | 6/1998 | Yoshimura et al. |
| 5,862,049 | A | 1/1999 | Sato et al. |
| 6,225,986 | B1 | 5/2001 | Sato et al. |
| 6,239,792 | B1 | 5/2001 | Yanagisawa et al. |
| 6,288,711 | B1 | 9/2001 | Tanaka et al. |
| 6,463,176 | B1 | 10/2002 | Matsugu et al. |
| 6,611,258 | B1 | 8/2003 | Tanaka et al. |
| 7,054,850 | B2 | 5/2006 | Matsugu |
| 7,881,524 | B2 | 2/2011 | Matsugu et al. |
| 8,014,572 | B2 * | 9/2011 | Xiao et al. ............. 382/118 |
| 8,028,284 | B2 * | 9/2011 | Ohkawa ............. 718/100 |
| 8,325,999 | B2 * | 12/2012 | Kapoor et al. ......... 382/118 |
| 2009/0087036 | A1 * | 4/2009 | Imaoka ............. 382/118 |
| 2009/0089235 | A1 | 4/2009 | Torii et al. |
| 2009/0324060 | A1 | 12/2009 | Sato et al. |

FOREIGN PATENT DOCUMENTS

| | | |
|---|---|---|
| JP | 3078166 B | 8/2000 |
| JP | 2002-008032 A | 1/2002 |

OTHER PUBLICATIONS

U.S. Appl. No. 12/970,712, filed Dec. 16, 2010. Applicant: Takashi Suzuki, et al.
B. Moghaddam, et al.,"Beyond Eigenfaces: Probabilistic Matching for Face Recognition", M. I. T. Media Laboratory Perceptual Computing Section Technical Report No. 443, Apr. 1998.
B. Moghaddam, et al., "Probabilistic Visual Learning for Object Representation", IEEE Transactions on Pattern Analysis and Machine Intelligence, vol. 19, No. 7, Jul. 1997.

* cited by examiner

*Primary Examiner* — Usmaan Saeed
*Assistant Examiner* — Cecile Vo
(74) *Attorney, Agent, or Firm* — Fitzpatrick, Cella, Harper & Scinto (57) ABSTRACT

A pattern identification apparatus identifies a pattern that exists in input data using registration data including data of a reference pattern or a feature amount thereof and identification parameters defining processing details for comparing the input data with the registration data, the apparatus holding the registration data and the identification parameters in association with a label. The apparatus acquires registration data, identification parameters, and a label generated by an external apparatus, and registers the acquired registration data and identification parameters in association with the acquired label. If the registration data and identification parameters associated with the same label as acquired label are already registered, in the additional registration, either the stated acquired identification parameters or the identification parameters that is already registered in association with the same label are selected, and the stated acquired registration data and the selected identification parameters are additionally registered in association with the acquired label.

6 Claims, 9 Drawing Sheets

COMPATIBILITY DETERMINATION UNIT — 141

COMPATIBILITY INFORMATION TABLE — 143

142 — COMPATIBILITY INFORMATION HOLDING UNIT

36 — COMPATIBILITY CONFIRMATION UNIT

| source \ destination | CAMERA A | CAMERA B | CAMERA C | PC | SERVER |
|---|---|---|---|---|---|
| CAMERA A | COMPLETE COMPATIBILITY | DIMENSIONAL COMPRESSION METHOD/LOCAL REGION | FEATURE NUMBER | FEATURE AMOUNT | COMPLETE COMPATIBILITY |
| CAMERA B | LOCAL REGION | COMPLETE COMPATIBILITY | NO COMPATIBILITY | ⋮ | COMPLETE COMPATIBILITY |
| CAMERA C | ⋮ | ⋮ | COMPLETE COMPATIBILITY | ⋮ | COMPLETE COMPATIBILITY |
| PC | ⋮ | ⋮ | ⋮ | COMPLETE COMPATIBILITY | COMPLETE COMPATIBILITY |
| SERVER | ⋮ | ⋮ | ⋮ | COMPLETE COMPATIBILITY | COMPLETE COMPATIBILITY |

FIG. 9

PATTERN IDENTIFICATION APPARATUS AND CONTROL METHOD THEREOF

BACKGROUND OF THE INVENTION

1. Field of the Invention

The present invention relates to a pattern identification apparatus capable of additionally registering a pattern to be identified, and to a control method thereof.

2. Description of the Related Art

A facial identification technique for identifying an individual's face can be given as an example of an identification technique using pattern recognition, or a technique that typically identifies an object that is a subject within image data as the same object that is a subject in a different piece of image data. As used hereinafter in this specification, "pattern identification" will refer to judging differences in individual patterns (for example, differences in people that are separate individuals). On the other hand, "pattern detection" will refer to judging items that fall into the same category without distinguishing between individuals (for example, detecting faces without distinguishing between individuals).

A method such as that described in Baback Moghaddam's *Beyond Eigenfaces: Probabilistic Matching for Face Recognition* (M.I.T. Media Laboratory Perceptual Computing Section Technical Report No. 443) ("Document 1" hereinafter) and Probabilistic Visual Learning for Object Representation (IEEE Transactions on Pattern Analysis and Machine Intelligence, Vol. 19, No. 7, July 1997) ("Document 2" hereinafter), can be given as an example of a facial identification technique. This features an algorithm that enables the real-time registration and additional learning of faces by replacing individual identification problems caused by faces with a two-class identification problem having feature classes called "subtracted faces".

For example, with the generally-known facial identification that employs a support vector machine (SVM), in order to identify the faces of n people, n SVM discriminators that identify the faces of registered people and the faces of people that are not registered are necessary. SVM learning is necessary when registering the faces of people. In SVM learning, it is necessary to store large amounts of data including the faces of people to be registered, people who are already registered, and other people, which results in extremely long calculation times; thus methods that carry out calculations in advance have generally been used.

However, according to the method in Documents 1 and 2, additional learning can be rendered essentially unnecessary by replacing the individual identification problem with the two-class identification problem discussed hereinafter. The two classes are a varying feature class related to lighting variations, expression/orientation, and so on among images of the same person, or an "intra-personal class", and a varying feature class related to images of different people, or an "extra-personal class". Assuming that the distributions of the stated two classes are constant regardless of the specific individual, a discriminator is configured by having reduced the individual facial identification problems to identification problems of the stated two classes. A large number of images are prepared in advance, and a discriminator that identifies the varying feature class for the same person and the varying feature class for different people carries out learning. For a new registrant, it is acceptable to store only an image of the face (or the result of extracting the necessary features from the image of the face). During identification, differential features are taken from two images, and the stated discriminator judges whether the people in the images are the same person or different people. Through this, a large amount of learning, which was necessary when registering the faces of individuals using an SVM and the like, is no longer necessary, and objects can therefore be registered in real time.

However, even if the algorithm renders additional learning unnecessary, additional learning is nevertheless a useful method for improving identification capabilities. For example, even if the configuration is such that identification is carried out using the two classes of identification problems as described above, the identification capabilities can be improved through additional learning that adjusts the identification parameters so as to enable the proper identification of a newly-registered image. There is actually a higher demand now than there was before to introduce additional learning that improves the identification capabilities by adjusting the identification parameters so as to be specialized for data registered by a user. For example, there are cases, in the recognition of individuals using the faces of people, where prioritizing an improvement of the robustness with respect to the aforementioned variations leads to degradation in the identification capabilities for similar people. It is often the case in consumer devices such as digital cameras that particularly plural similar people, such as parents and children, siblings, and so on are registered. Additional learning is thought to be a useful method for improving the identification capabilities for similar people while also maintaining the robustness with respect to variations. Carrying out additional learning generates parameters specialized for the identification of people registered by a user, and particularly people that are similar, which can be assumed to improve the identification capabilities.

However, if a user who owns multiple devices carries out additional learning in the individual devices in order to improve the identification capabilities, the specifics of the additional learning will differ from device to device, and thus the identification capabilities will also differ from device to device as a result. Furthermore, if such a user wishes to have the same identification capabilities in his or her multiple devices, in order to achieve the same identification results for an identification target that has been registered in the multiple devices, it is necessary to carry out additional learning for that identification target in each device; this places a heavy burden on the user and requires a significant amount of time for learning.

SUMMARY OF THE INVENTION

Having been achieved in light of the aforementioned problems, an aspect of the present invention provides a pattern identification apparatus and a control method thereof that enable the sharing of identification parameters acquired by additional learning with other devices and achieve a reduction in the effort and time required from the user for the additional learning.

According to one aspect of the present invention, there is provided a pattern identification apparatus that identifies a pattern that exists in input data using registration data that includes data of a reference pattern or a feature amount thereof and identification parameters that define processing details for comparing the input data with the registration data, the apparatus comprising: a holding unit configured to hold the registration data and the identification parameters in association with a label; an acquisition unit configured to acquire registration data, identification parameters, and a label generated by an external apparatus; and an adding unit configured to add the registration data and identification parameters acquired by the acquisition unit to the holding unit in association with the label acquired by the acquisition unit, wherein in the case where registration data and identification parameters associated with the same label as acquired by the acquisition unit are already held in the holding unit, the adding unit selects either the identification parameters acquired by the acquisition unit or the identification parameters held in the holding unit in association with the same label, and adds the registration data acquired by the acquisition unit and the selected identification parameters to the holding unit in association with the label acquired by the acquisition unit.

Also according to another aspect of the present invention, there is provided a pattern identification apparatus that identifies a pattern that exists in input data using registration data that includes data of a reference pattern or a feature amount thereof and identification parameters that define processing details for comparing the input data with the registration data, the apparatus comprising: a holding unit configured to hold the registration data and the identification parameters in association with a label; an acquisition unit configured to acquire registration data, identification parameters, and a label generated by an external apparatus; and an adding unit configured to add the registration data and identification parameters acquired by the acquisition unit to the holding unit in association with the label acquired by the acquisition unit, wherein the adding unit: holds compatibility information indicating an identification parameter that can be shared with a different device type; and extracts an identification parameter that can be shared from among the identification parameters acquired by the acquisition unit by referring to the device type of the external apparatus and the compatibility information, adds the extracted identification parameter to the holding unit in association with the label, and supplements missing identification parameters by using a default value or additional learning.

Also, according to another aspect of the present invention, there is provided a control method for a pattern identification apparatus that identifies a pattern that exists in input data using registration data that includes data of a reference pattern or a feature amount thereof and identification parameters that define processing details for comparing the input data with the registration data, the method comprising: holding the registration data and the identification parameters in association with a label in a holding unit; acquiring registration data, identification parameters, and a label generated by an external apparatus; and adding the registration data and identification parameters acquired in the step of acquiring to the holding unit in association with the label acquired in the step of acquiring, wherein in the case where registration data and identification parameters associated with the same label as acquired in the step of acquiring are already held in the holding unit, the step of adding selects either the identification parameters acquired in the step of acquiring or the identification parameters held in the holding unit in association with the same label, and adds the registration data acquired in the step of acquiring and the selected identification parameters to the holding unit in association with the label acquired in the step of acquiring.

Furthermore, according to another aspect of the present invention, there is provided a control method for a pattern identification apparatus that identifies a pattern that exists in input data using registration data that includes data of a reference pattern or a feature amount thereof and identification parameters that define processing details for comparing the input data with the registration data, the method comprising: holding the registration data and the identification parameters in association with a label in a holding unit; acquiring registration data, identification parameters, and a label generated by an external apparatus; and adding the registration data and identification parameters acquired in the step of acquiring to the holding unit in association with the label acquired in the step of acquiring, wherein in the step of adding, an identification parameter that can be shared is extracted from among the identification parameters acquired in the step of acquiring by referring to compatibility information indicating an identification parameter that can be shared with another device type and the device type of the external apparatus, the extracted identification parameter is added to the holding unit in association with the label, and missing identification parameters are supplemented by using a default value or additional learning.

Further features of the present invention will become apparent from the following description of exemplary embodiments with reference to the attached drawings.

DESCRIPTION OF THE EMBODIMENTS

Hereinafter, a first embodiment of the present invention will be described in detail with reference to the appended drawings.

First Embodiment

Configuration of Pattern Identification Apparatus

Figure 1:
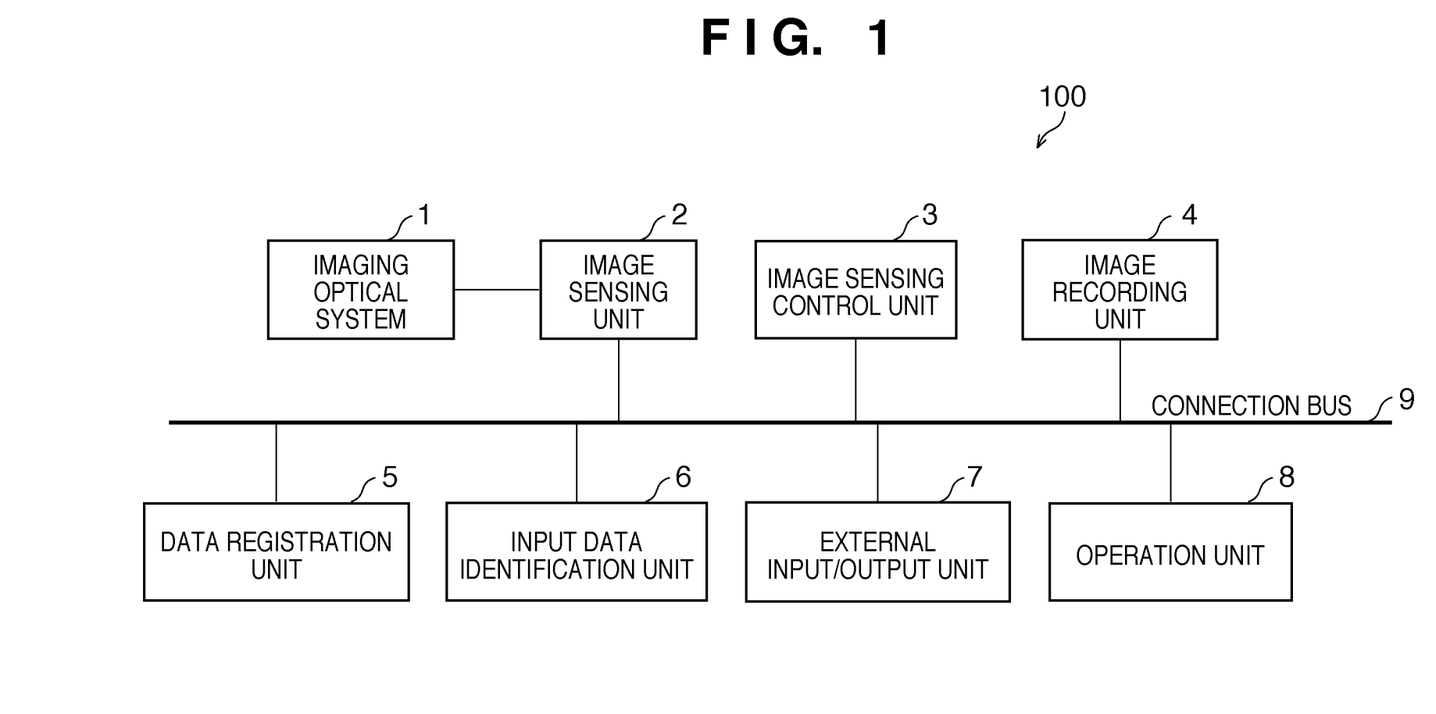
FIG. 1 is a block diagram illustrating an exemplary configuration of a digital camera in which a pattern identification apparatus has been applied.

FIG. 1 is a block diagram illustrating an exemplary configuration of a digital camera 100 in which a pattern identification apparatus according to the first embodiment has been applied. Although the present embodiment describes an example in which the pattern identification apparatus has been applied in a digital camera, it should be noted that the present invention is not limited thereto, and it should be clear that the pattern identification apparatus can also be applied in an information processing apparatus such as a personal computer or the like.

In the digital camera 100, an imaging optical system 1 is configured of an optical lens that includes a zoom mechanism. This imaging optical system may also include a driving mechanism for the pan/tilt axial directions. Typically, a CCD or CMOS image sensor is used as an image sensor in an image sensing unit 2. The image sensing unit 2 outputs, as image data, a predetermined image signal (for example, a signal obtained through subsampling and block readout) in accordance with a readout control signal from a sensor driving circuit (not shown). An image sensing control unit 3 controls the timing at which image sensing actually occurs based on an instruction from a user (an angle-of-view adjustment instruction, the depression of a shutter button, and so on) and information from a data registration unit 5 or an input data identification unit 6. An image recording unit 4 is configured of a semiconductor memory or the like, and holds image data that has been transmitted from the image sensing unit 2. In addition, the image recording unit 4 transmits image data at a predetermined timing in accordance with requests from the data registration unit 5 and the input data identification unit 6.

The data registration unit 5 extracts information of an object to be identified, typically from image data, and records/holds that information. Specific details of the configuration of and actual processes performed by the data registration unit 5 will be described later. The input data identification unit 6 identifies a target object, and more typically, an object within image data, based on input data and data acquired from the data registration unit 5. The specific configuration of and details of processes performed by the input data identification unit 6 will also be described later. Note that the data registration unit 5 and the input data identification unit 6 may each be dedicated circuits (ASICs), processors (reconfigurable processors, DSPs, or the like), and so on. These units may also exist as a single dedicated circuit or as programs executed in a generic circuit (a CPU of a PC).

An external input/output unit 7 is used in the exchange of data with an external apparatus. Typically, this exchange can be thought of as exchange of data with an external apparatus using an external storage apparatus such as a Compact Flash® device. Alternatively, input/output can be carried out via a network device, or a direct connection with the external apparatus (for example, a wired connection such as USB, a wireless connection such as Bluetooth or infrared communication, and so on) may be used. The external input/output unit 7 inputs/outputs results output by the data registration unit 5 and the input data identification unit 6 to and from the external apparatus as electronic data. Data input/output with the data registration unit 5 will be described in detail later. Meanwhile, a destination for the output of identification results may also include the use of a monitor such as a CRT, a TFT liquid crystal display, or the like in the external input/output unit 7. The image data acquired from the image sensing unit 2 and the image recording unit 4 may be displayed, or the results output by the data registration unit 5 and the input data identification unit 6 may be displayed superimposed upon the image data.

Meanwhile, a user can carry out various types of operations including setting a mode for carrying out data registration operations, operations regarding registration data, and so on via an operation unit 8. A connection bus 9 is a bus for performing control and making data connections between the aforementioned constituent elements.

<Overall Flow>

Figure 2:
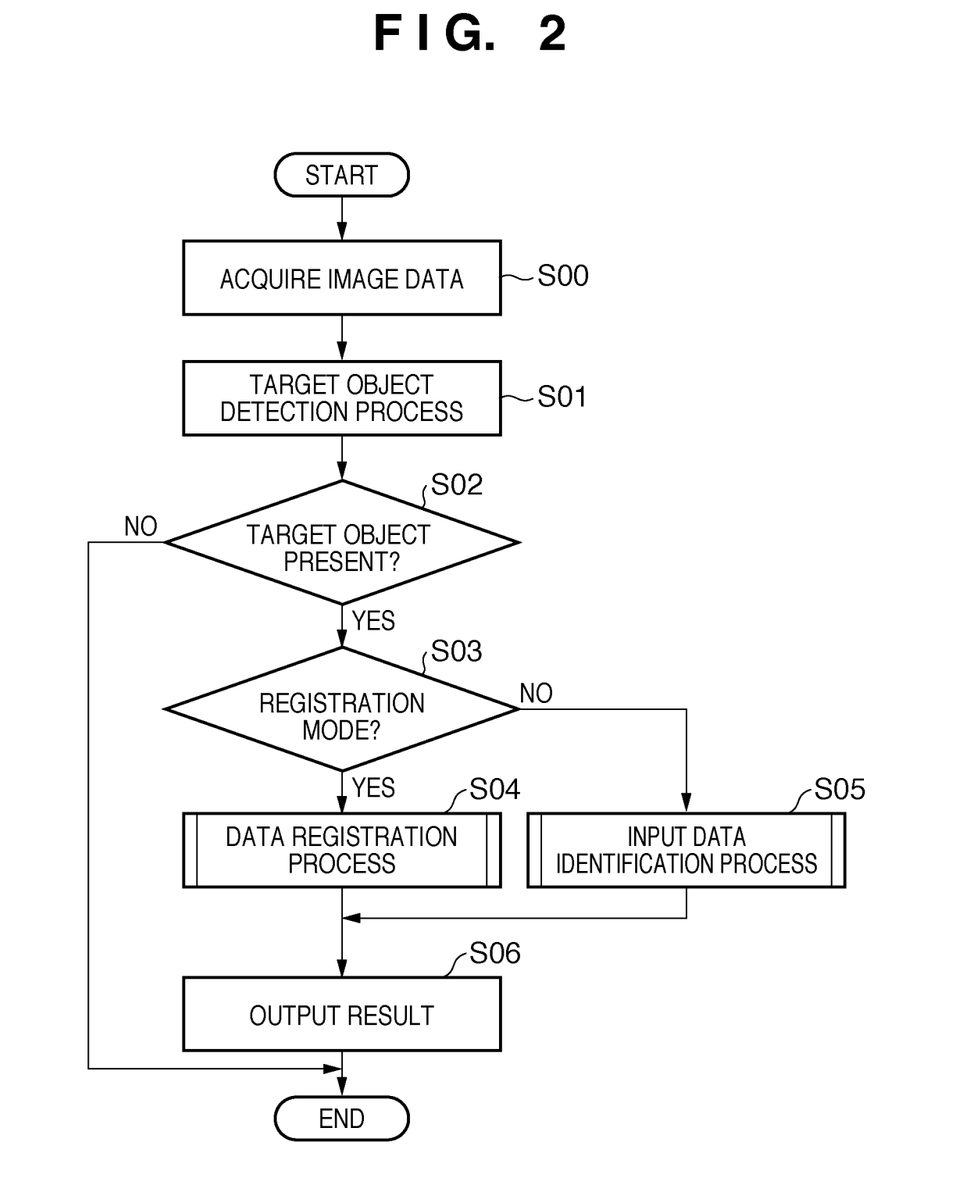
FIG. 2 is a process flowchart of a pattern identification apparatus according to an embodiment.

FIG. 2 illustrates an example of the overall processing performed by the pattern identification apparatus according to the present embodiment. Hereinafter, a process carried out when the pattern identification apparatus identifies an input pattern will be described with reference to FIG. 2. As will be described in the following, when identifying a pattern that exists in input data, the pattern identification apparatus employs identification parameters that define registration data expressing a reference pattern and the processing details for comparing the input data with the registration data. The registration data includes any of, for example, the data of the reference pattern as a whole, data of a local region, a feature amount, and the like. Although the following describes the case where the pattern to be identified (an identification target pattern) is an object within an image, and more specifically, the face of a person, it goes without saying that the present invention is not limited thereto. In other words, various other types of data such as text image data, audio data, and so on can also be applied in the present invention.

First, the input data identification unit 6 acquires image data from the image recording unit 4 (S00). Then, the input data identification unit 6 detects a target object, or to be more specific, carries out a detection process for the face of a person, on the acquired image data (S01). A known technique may be used as the method for detecting the face of the person from the image. For example, a technique such as that proposed in Japanese Patent No. 3078166, Japanese Patent Laid-Open No. 2002-8032, or the like may be employed. Even in the case where an object aside from the face of a person is to be detected, the detection can be carried out using one of the aforementioned techniques by employing a desired object as training data.

If a target object does not exist within the input image (No in S02), the process ends. However, in the case where a target pattern does exist within the input image (Yes in S02), the input data identification unit 6 determines whether the processing mode is a registration mode or an identification mode (S03). The registration mode or the identification mode can be set in advance by the user using the operation unit 8. In the case where it has been determined that the mode is the registration mode (Yes in S03), the data registration unit 5 carries out a data registration process (S04). The specific content of the data registration process will be described in detail later. In the case where the mode is the identification mode (No in S03), the input data identification unit 6 carries out an identification process on the input data (S05). The input data identification process will also be described later. Finally, the result of the data registration process or the input data identification process is output to the external input/output unit 7 (S06). The foregoing is the overall process performed by the pattern identification apparatus according to the present embodiment.

<Input Data Identification Unit 6>

Figure 3:
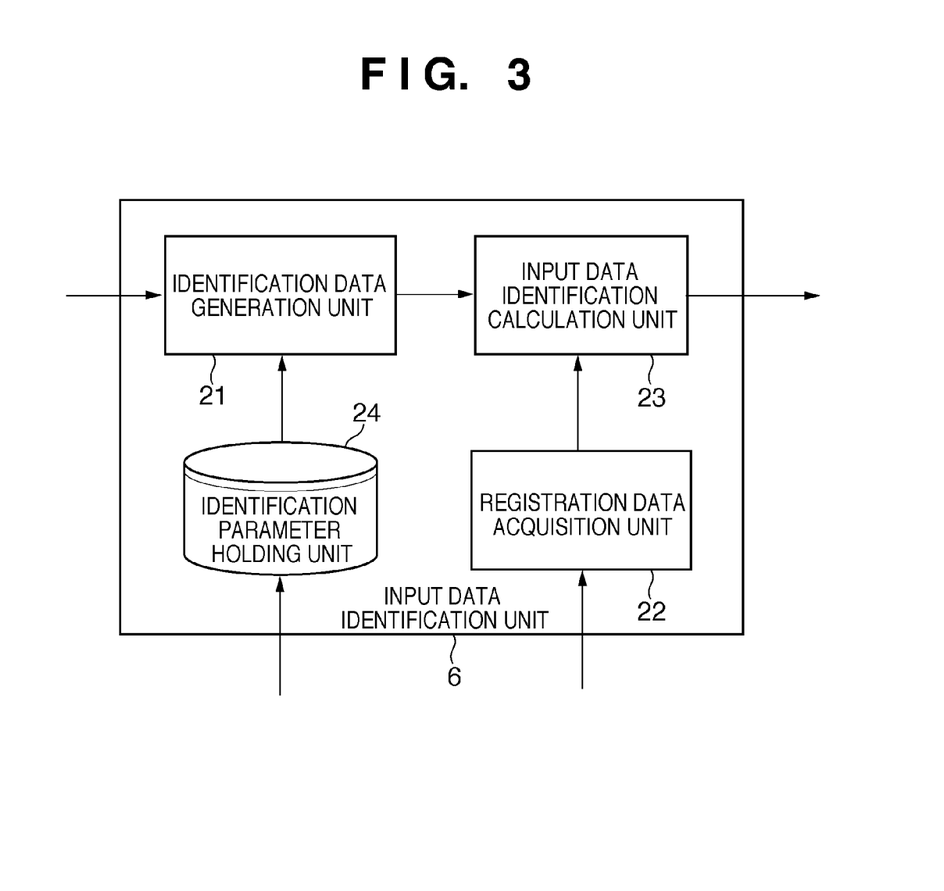
FIG. 3 is a block diagram illustrating an exemplary configuration of an input data identification unit.

The input data identification process (S05) performed by the input data identification unit 6 will be described hereinafter. FIG. 3 is a block diagram illustrating, in detail, an exemplary configuration of the input data identification unit 6. In the input data identification unit 6, an identification data generation unit 21 extracts information necessary to identify a target object from the image data acquired from the image recording unit 4, using identification parameters held in an identification parameter holding unit 24. A registration data acquisition unit 22 acquires registration data necessary for the identification of input data from the data registration unit 5. An input data identification calculation unit 23 performs an identification process on the input data using the identification data acquired by the identification data generation unit 21 and the registration data acquired by the registration data acquisition unit 22. The identification parameter holding unit 24 holds various types of parameters used during the identification process. In other words, the identification parameter holding unit 24 holds identification parameters that define the details of processing for comparing the input data (image data) with the registration data for the purpose of identification. Note that the result of the processing performed by the data registration unit 5 (in other words, the registration data) may be stored in the identification parameter holding unit 24. The identification parameters are stored as unique parameters for the registration data for each instance of registration data, or in other words, along with label information of the registration data. In this manner, the registration data and identification parameters are held in association with labels.

Figure 4:
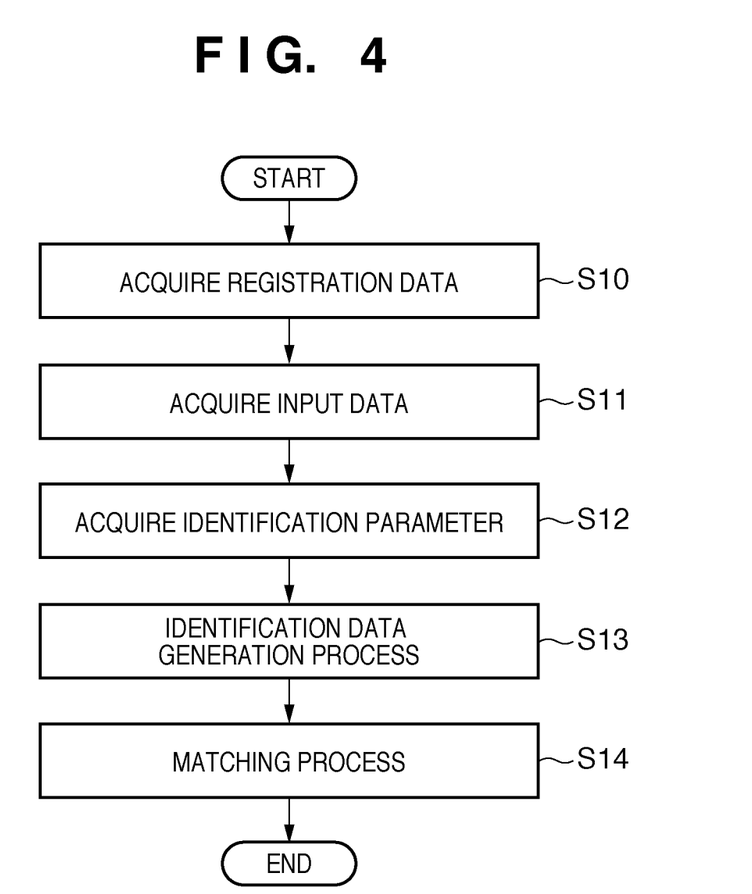
FIG. 4 is a flowchart illustrating an exemplary process performed by an input data identification unit.

FIG. 4 is a flowchart illustrating an example of the identification process carried out by the input data identification unit 6. First, the registration data acquisition unit 22 acquires the registration data from the data registration unit 5 (S10). The registration data is typically a normalized image that has been enlarged or reduced to a predetermined size through slope correction or the like after first cutting out the target object from the input image. Alternatively, a similar process as an identification data generation process (described later) may be carried out in advance, and a feature amount that was extracted may be employed as the registration data. This process will be described again during the descriptions of the data registration unit 5. The identification data generation unit 21 acquires, from the image recording unit 4, the input data that is to be processed (in this example, the input image) (S11). Next, the identification data generation unit 21 acquires, from the identification parameter holding unit 24, the parameters to be used in the identification (called the "identification parameters" hereinafter) (S12). Here, the "identification parameters" typically includes a method for extracting a feature amount (described later), the number of dimensions of dimensional compression, and so on.

Next, the identification data generation unit 21 carries out an identification data generation process using the input data to be processed and the identification parameters (S13). Note that in the case where the registration data is an image, the identification data generation process is carried out not only on the input image but also on the registration data. In the identification data generation process, the identification data generation unit 21 cuts out the target object (typically the face of a person) from the input data, and extracts a feature amount in accordance with the identification parameters after first normalizing the target object to a predetermined size and orientation. Here, for example, the feature amount may be calculated using the luminosity of the image as-is, or the luminosity may be converted to a local binary pattern, increment signs or the like, and the result thereof used as a feature amount that is more robust with respect to variations. Alternatively, the result of reducing the dimensions of a feature vector by carrying out principal component analysis (PCA), independent component analysis (ICA), or the like on the feature amount may be employed as a new feature amount. Further still, the feature amount may first be set to a partial region and then extracted. Hereinafter, this partial region will be referred to as a "local region". For example, in the case where the target object is the face of a person, locations that are likely to appear in the features of an individual, such as the eyes, the vicinity of the mouth, and so on in the face may be set as a local region, and may then be extracted as a feature amount after performing a conversion such as that mentioned above. How many local regions to use, where to set the local regions, and so on may all be held in advance in the identification parameter holding unit 24 in advance as identification parameters.

Next, the input data identification calculation unit 23 carries out a matching process on the registration data acquired in S10 and the identification data (the feature amount obtained in S13) obtained from the input data acquired S11 (S14). The matching process typically involves a correlation process on the feature vectors extracted from the registration data and the input data, respectively. In the case where there are multiple pieces of registration data, the matching process employs all of those pieces of registration data in a round-robin format. The correlation process may be a simple dot product, or a correlation function may be found.

For example, in the case where a local region is set and feature extraction is carried out as described earlier, the feature amount matching is carried out on the local regions that correspond to the input data and the registration data, respectively. The same number of matching results as there are local regions is obtained, but the average of those multiple values may be used as the final output. Furthermore, instead of a simple average, a weighted average found in advance through learning or the like may be found. In this manner, it is known that carrying out matching at a local level is robust with respect to variations such as illumination variations, part of the face being hidden, and so on.

Meanwhile, as the output of the matching process, a situation in which a binary (0 or 1) expressing whether or not there is a match with the registration data is output and a situation in which a normalized output value (a real number value from 0 to 1) is output as a likelihood can be considered. Furthermore, in the case where there are multiple pieces of registration data (multiple registrants), a likelihood may be output for each piece of registration data (registrant). Alternatively, only the result for the registration data that matches the closest may be output. In addition, rather than a likelihood for each individual piece of registration data, a likelihood for a class to which the registration data belongs may be output as well. In other words, in the case of a person, the likelihood of an ID (name) of that person may be output instead of a result for individual registered face images.

The foregoing has described an example of a processing flow performed by the input data identification unit 6.

<Data Registration Unit 5>

Figure 5A:
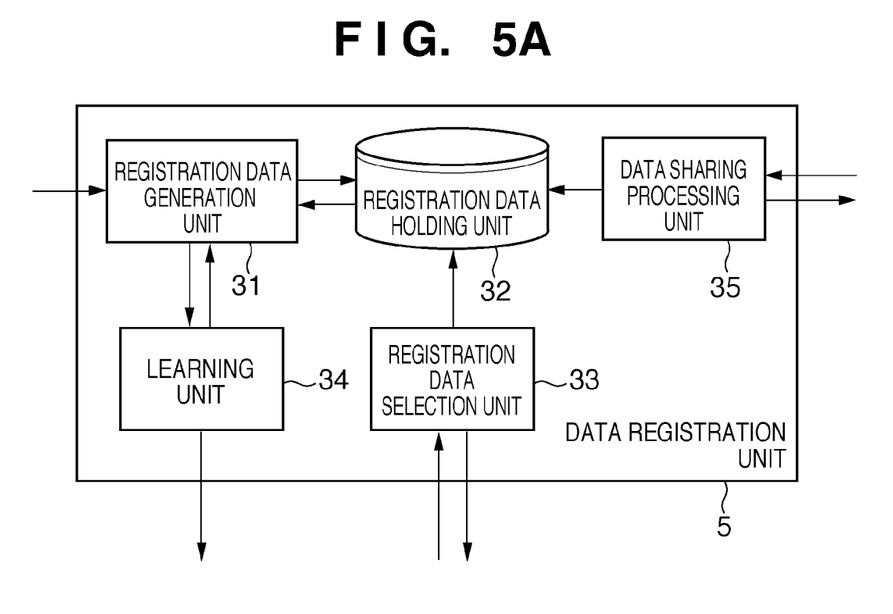
FIG. 5A is a block diagram illustrating an exemplary configuration of a data registration unit according to a first embodiment.

Next, the data registration process performed by the data registration unit 5 will be described. FIG. 5A is a block diagram illustrating, in detail, an exemplary configuration of the data registration unit 5 according to the first embodiment. In the data registration unit 5, a registration data generation unit 31 generates registration data necessary for identifying an individual target object from the image data acquired from the image recording unit 4. For example, in the case where a two-class problem, such as the intra-class and extra-class discussed in Document 1, is judged, an image of the face of a person is typically used as the registration data. Meanwhile, the image data of the face of the person detected through a facial detection process is stored in a registration data holding unit 32 after the size, orientation (planar rotation direction), and so on have been normalized. At this time, the label information set for the registration image by the user through the operation unit 8 or the like is also recorded in the registration data holding unit 32. Note that it is also possible to reduce the amount of data by holding, as the registration data, only the data necessary during identification in the registration data holding unit 32, rather than holding the image data itself. For example, in the case where an identification calculation is carried out using vector correlation of the local region of that object, it is possible for the data registration unit 5 to cut out only that local region in advance and hold the cut-out local region as the registration data.

As described thus far, the registration data generation unit 31 extracts the necessary information as appropriate from the image, and stores data obtained by carrying out a predetermined conversion as described earlier in the registration data holding unit 32 as a feature vector for carrying out the identification of the object.

A learning unit 34 receives the registration data from the registration data generation unit 31 and carries out additional learning so as to improve the identification capabilities of the registration data. For example, when employing a method that carries out identification having set a local region as mentioned earlier in the descriptions of the input data identification unit 6, the number of local regions, the dimensional compression method and number of dimensions of the feature vector in the local region, and so on are learned for each instance of registration data. A known technique can be employed as the method of learning performed by the learning unit 34. For example, in the case where a method that carries out matching for each local region as described earlier is employed, a boosting technique as exemplified by Ada-Boost can be applied having taken a combination of the local region and the parameters thereof as a single weak discriminator. At the most basic level, the registration data may be used as the learning data. In other words, the additional learning is carried out using the registration data that has already been registered and data that will be registered thereafter. Alternatively, data that is only for learning may be held in advance for the purposes of the additional learning. In this manner, the additionally-learned parameters are stored in the identification parameter holding unit 24.

A registration data selection unit 33 reads out necessary registration data from the registration data holding unit 32 in accordance with a request from the input data identification unit 6 described earlier, and transmits the registration data to the input data identification unit 6. A data sharing processing unit 35 carries out a process for sharing the registration data and the registration data identification parameters with other devices via the external input/output unit 7 or the like. Hereinafter, the content of processing performed by the data sharing processing unit 35 will be described in detail.

<Data Sharing Processing Unit 35>

Figure 6:
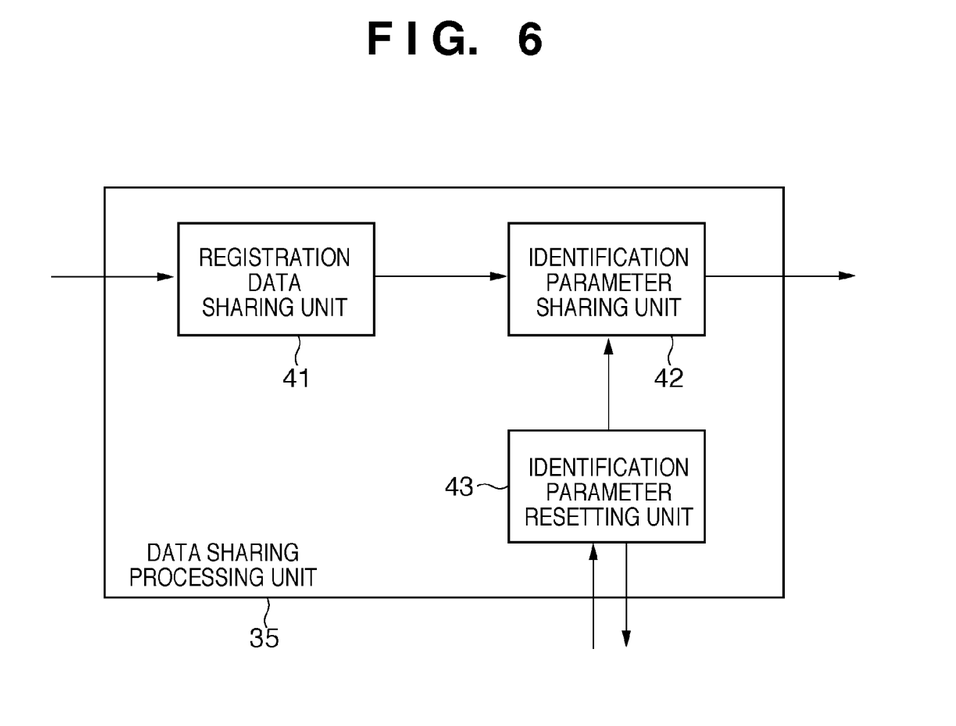
FIG. 6 is a block diagram illustrating an exemplary configuration of a data sharing processing unit.

Processing performed by the data sharing processing unit 35 will be described. FIG. 6 is a block diagram illustrating an exemplary configuration of the data sharing processing unit 35. In the data sharing processing unit 35, a registration data sharing unit 41 carries out a process for sharing the registration data. For example, the registration data sharing unit carries out a process for sharing the image data for pattern identification with other devices. The registration data sharing unit 41 compares a pair that includes the label information and the image data (registration data) with registration data already acquired via the external input/output unit 7 that is currently held. As a result of this comparison, registration data that has label information that is not yet held is copied to and stored in the registration data holding unit 32. On the other hand, in the case where the same label is already registered, it is determined whether or not to store that data based on predetermined criteria. The number of pieces of registration data for the same label, whether or not all the pieces of registration data will fit in the storage space, and so on can be given as examples of the predetermined criteria. Note that it may be judged whether or not the registration data is the same. This is because situations in which different labels are assigned to the same registration data are also possible. In such a case, the user may be prompted to specify which label is the matching label through the operation unit 8.

An identification parameter sharing unit 42 carries out a process for sharing the identification parameters. Meanwhile, an identification parameter resetting unit 43 resets the identification parameters so that the pre- and post-sharing identification parameters resulting from the process performed by the identification parameter sharing unit 42 are consistent. The specific content of the processes performed by the identification parameter sharing unit 42 and the identification parameter resetting unit 43 will be described in detail hereinafter.

Note that, as described above, it is possible for multiple pieces of registration data to be registered in association with a single label in the present embodiment. As opposed to this, with respect to the identification parameters, a single type of identification parameter is registered for a single label, as will be described later. In this manner, an improvement in the identification capabilities and conservation of memory space is realized by performing identification on images having the same label using the same identification parameters. However, in the case where, for example, a single label has been assigned to a specific person, there is the possibility that carrying out identification with a single identification parameter will conversely reduce the identification capabilities if both an image having a front view and an image having a side view exist under the same label. Accordingly, attributes such as the shooting direction (front view, side view), the shooting environment (sunlight, fluorescent light), and so on may be added to the labels, and the same identification parameters may then be used in the case where the label and attributes match. If such is the case, the phrase "the labels match" in the following descriptions of the sharing process can be taken to mean "the labels and attributes thereof match". In addition, the aforementioned problem can be avoided by employing a label in which the person's name and the shooting direction is written.

<Identification Parameter Sharing Process/Resetting Process>

Figure 7:
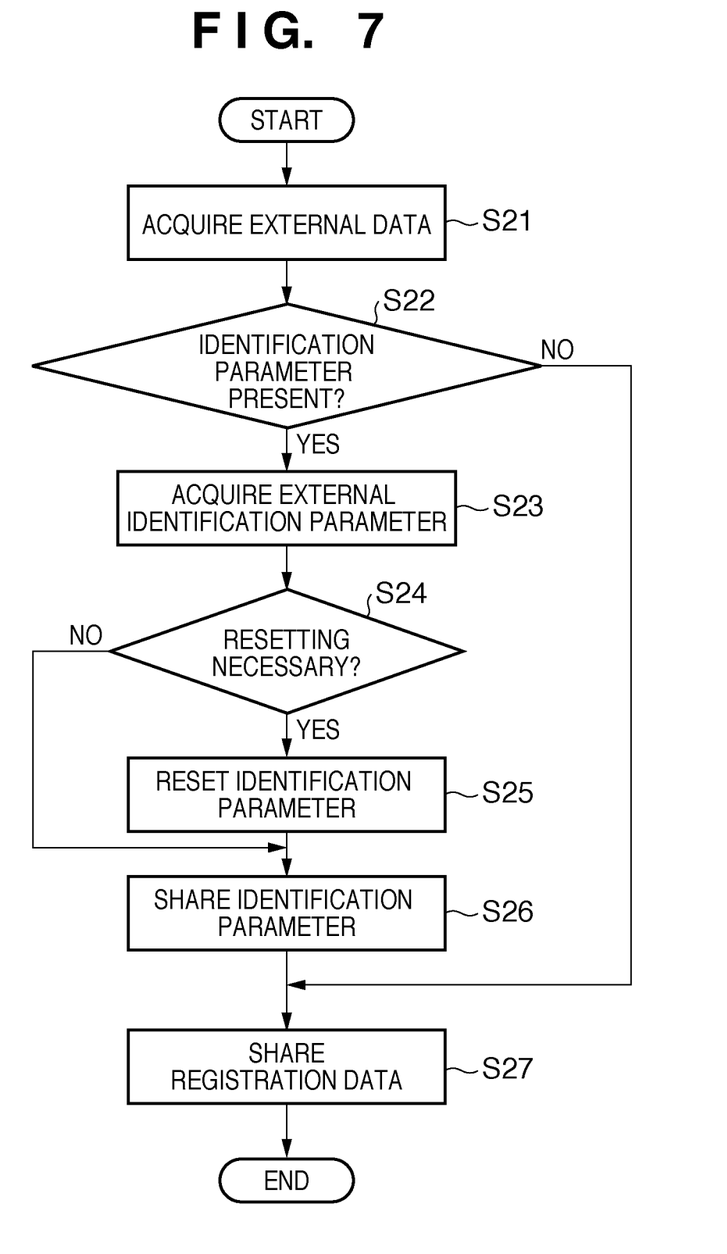
FIG. 7 is a flowchart illustrating an example of a registration data/identification parameter sharing process.

FIG. 7 is a flowchart illustrating an example of processes performed by the registration data sharing unit 41, the identification parameter sharing unit 42, and the identification parameter resetting unit 43. First, the registration data sharing unit 41 acquires, from the external input/output unit 7, external data that includes the registration data to be shared and a label (S21). Next, the identification parameter sharing unit 42 confirms whether identification parameters used for the identification of the registration data exist in the external data (S22). Here, the identification parameters are unique parameters for the registration data that is the target, such as that has been additionally learned by the learning unit 34. The determination as to whether or not the identification parameters exist may be carried out by preparing data, in advance, for determining whether the identification parameters exist in the external data, with the identification parameter sharing unit 42 reading out that data and carrying out determination. In the case where the identification parameters do not exist (No in S22), the registration data sharing unit 41 advances to a registration data sharing process (S27).

However, in the case where the identification parameters exist (Yes in S22), the identification parameter sharing unit 42 acquires the identification parameters from the external data (S23). Then, the identification parameter resetting unit 43 determines whether or not it is necessary to reset the acquired identification parameters (S24). Here, the determination as to whether or not the resetting is necessary may be carried out, for example, as follows. First, it is confirmed whether identification parameters having the same label as the identification parameters contained in the external data exist in the identification parameter holding unit 24. In the case where such identification parameters do exist, whether or not the sets of identification parameters are the same for that same label. In the case where both sets of identification parameters are exactly the same parameters, no action needs to be carried out (that is, resetting is unnecessary), but in the case where the sets of identification parameters are different, resetting is necessary. In the case where resetting is unnecessary (No in S24), the procedure advances to an identification parameter sharing process (S26). However, in the case where resetting is necessary (Yes in S24), the identification parameter resetting unit 43 carries out an identification parameter resetting process (S25). This identification parameter resetting process is realized by aligning both sets of identification parameters to one of the sets of identification parameters, for example, as described below. That is, of the acquired identification parameters and the identification parameters that are already held, the identification parameters are aligned to the identification parameters that have a higher identification rate, using the registration data that belongs the same label as evaluation data. Alternatively, and more simply, the time at which the identification parameters were learned (that is, the time at which the identification parameters were generated) may be recorded in advance, and the identification parameters may then be aligned to the newer of the identification parameters. Further still, the user may be allowed to select which identification parameters to align the identification parameters to via the operation unit 8 or the like.

Next, the identification parameter sharing unit 42 shares the identification parameters (S26). In the case where resetting was carried out in S25, the parameters may be updated to those parameters, whereas in the case where labels that correspond to the acquired identification parameters are not held in the registration data holding unit 32, the parameters may simply be copied and stored in the identification parameter holding unit 24. In S27, the registration data sharing unit 41 registers the registration data contained in the external data as described above. Note that the process of S27 may be executed immediately after S21.

As described thus far, according to the pattern identification apparatus of the first embodiment, by sharing both the registration data and the identification parameters, it is possible to share the identification capabilities among devices as well. For this reason, it is possible to reduce a problem in which the identification capabilities vary significantly depending on the device that is used. It is also possible to realize a reduction in the amount of time for additional learning.

Second Embodiment

Next, a second embodiment will be described. In the second embodiment, a configuration that realizes a function for implementing sharing among devices that perform different identification processes in the context of the registration data/identification parameters sharing function according to the first embodiment will be described. Note that descriptions of configurations that are the same as those in the first embodiment will be omitted in order to avoid prolixity. Furthermore, for the sake of simplifying the descriptions, the pattern that is to be identified will be described as the face of a person in an image, but the applicability of the present invention to other patterns aside from the faces of people is as described in the first embodiment.

<Data Registration Unit>

Figure 5B:
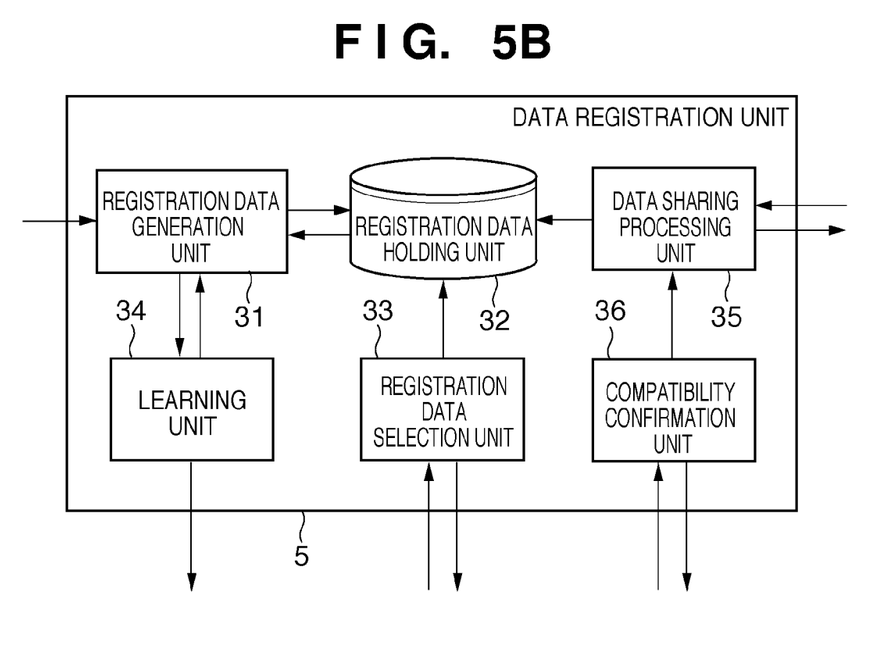
FIG. 5B is a block diagram illustrating an exemplary configuration of a data registration unit according to a second embodiment.

FIG. 5B is a block diagram illustrating an exemplary configuration of the data registration unit 5 according to the second embodiment. As compared to the first embodiment (FIG. 5A), a compatibility confirmation unit 36 has been added and part of the content of the processing performed by the data sharing processing unit 35 is different.

The compatibility confirmation unit 36 enables the sharing of parameters to the greatest extent possible among devices that share registration data and identification parameters, even in the case where the identification method used by the input data identification unit 6 is different among the devices. Hereinafter, the specific processing content of the data sharing processing unit 35 and the compatibility confirmation unit 36 will be described in detail.

Figure 8A:
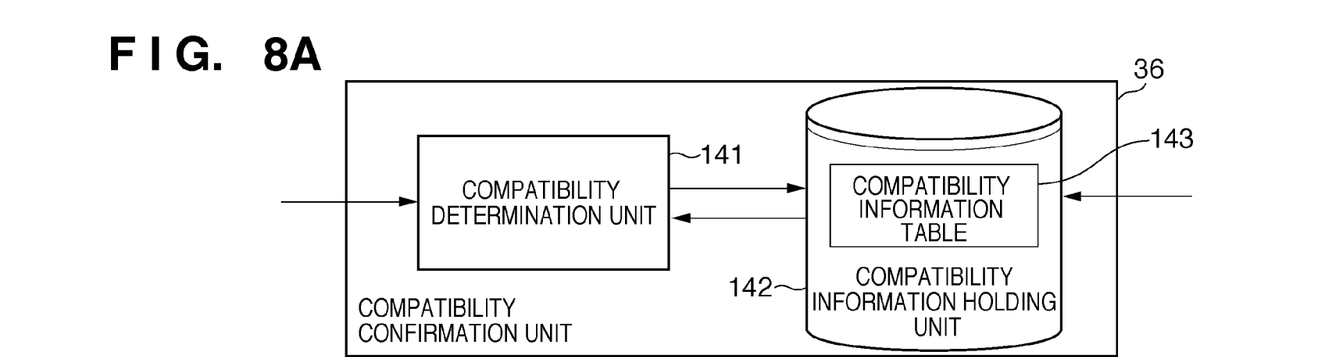
FIG. 8A is a block diagram illustrating an exemplary configuration of a compatibility confirmation unit.
Figure 8B:
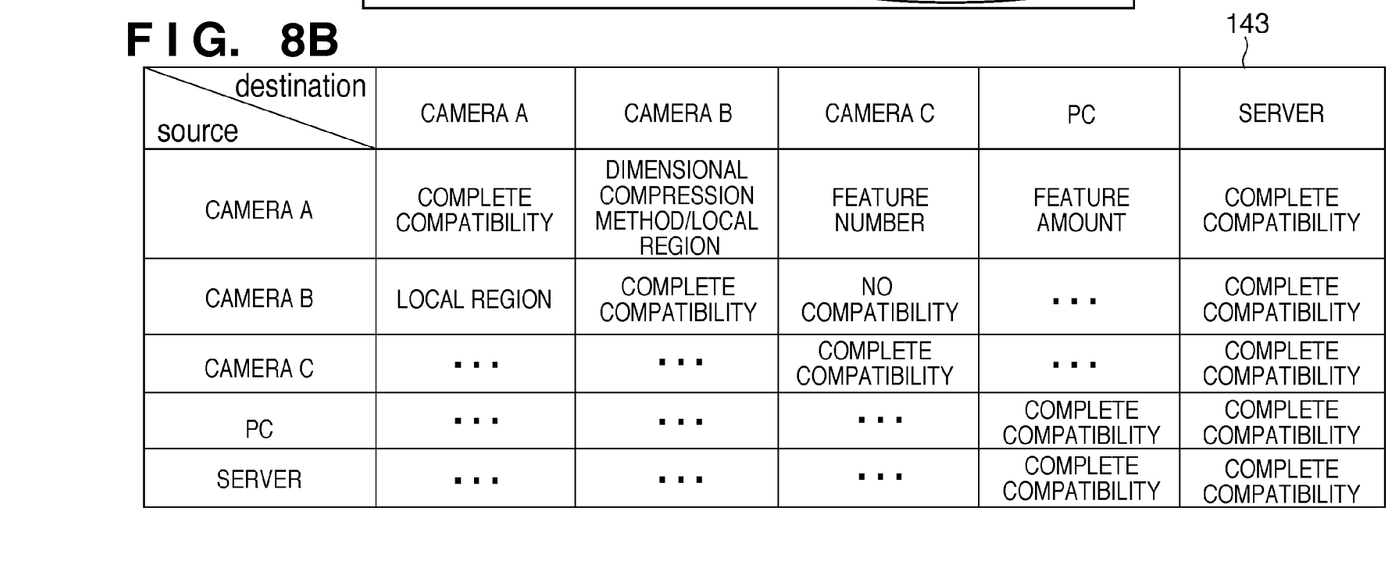
FIG. 8B is a diagram illustrating an example of a compatibility information table held by a compatibility information holding unit.

FIG. 8A is a block diagram illustrating an exemplary configuration of the compatibility confirmation unit 36. In the compatibility confirmation unit 36, a compatibility determination unit 141 determines whether or not the identification parameters contained in the external data acquired via the external input/output unit 7 are parameters that can be used in that data identification apparatus (that is, whether the parameters are compatible). A compatibility information holding unit 142 stores information regarding identification parameters that are compatible among multiple identification methods (that is, among multiple types of devices). FIG. 8B illustrates an example of compatibility information stored in the compatibility information holding unit 142. As shown in FIG. 8B, it is favorable for the compatibility information to be in table format. This compatibility information table 143 indicates identification parameters that are compatible, or in other words, can be used among different types of devices. The content of the compatibility information table 143 may be held in the device in advance, but may also be updated from the exterior via, for example, the external input/output unit 7.

The content of the compatibility information table 143 will now be described. Each row in the table expresses a type of device serving as the source of the identification parameters, whereas each column expresses a type of device serving as the destination. The cells in the table on the diagonal from the upper-left to the lower-right have registered data between the same type of device, and thus all of the parameters are compatible (complete compatibility). The cells that are not on that diagonal have registered data among devices of different types, and thus include partial incompatibilities. Furthermore, compatible parameters are written in the compatibility information table 143. Accordingly, in, for example, the case where the identification parameters of the device whose type is "camera A" are to be registered in the device whose type is "camera B", the dimensional compression method and the local region are compatible, and thus it can be understood that the base vectors and number, position, and so on of the local regions can be shared. As opposed to this, in the case where the identification parameters of the camera B are to be shared with the camera A, only the local region identification parameters can be shared. This is because, for example, the camera B is a device type that is superior to the camera A.

Note that the information of the parameter compatibility is not intended to be limited to that shown in FIG. 8B. For example, in the case where the pattern identification method is a method that unifies correlation values on a local region-by-local region basis, the information may include the number of local regions, the positions of the local regions, the dimensional compression methods for each local region, the number of feature vector dimensions for the local regions, and so on. Furthermore, learning algorithms, correlation computation methods, calculation resources, and so on may also be included as compatibility information. For example, including a learning algorithm in the compatibility information makes it possible to share the initial values of the learning among devices that have the same learning method. Meanwhile, by including calculation resources in the compatibility information, it is possible to carry out control so that additional learning that takes time is executed at an appropriate timing (a timing at which the necessary resources have been secured) and with an appropriate device (a device that can secure the necessary resources). Meanwhile, information of device types that provide external data (registration data, identification parameters, labels) may be held, for example, in the external data. Alternatively, in the case where the external input/output unit 7 acquires external data from an external storage device, the information of the device type may be stored in the external storage device under a predetermined data name. Furthermore, in the case where the external input/output unit 7 acquires the external data through communication with another device, the information of the device type may be acquired when, for example, the communication is established. Further still, it is also possible to store only the information of the source device in the compatibility information table.

In S26 of FIG. 7, the identification parameter sharing unit 42 registers only the identification parameters that are compatible, and supplements the missing identification parameters with default values. Alternatively, the missing identification parameters may be supplemented through additional learning. The identification parameter sharing process of S26 will be described hereinafter with reference to FIG. 9.

Figure 9:
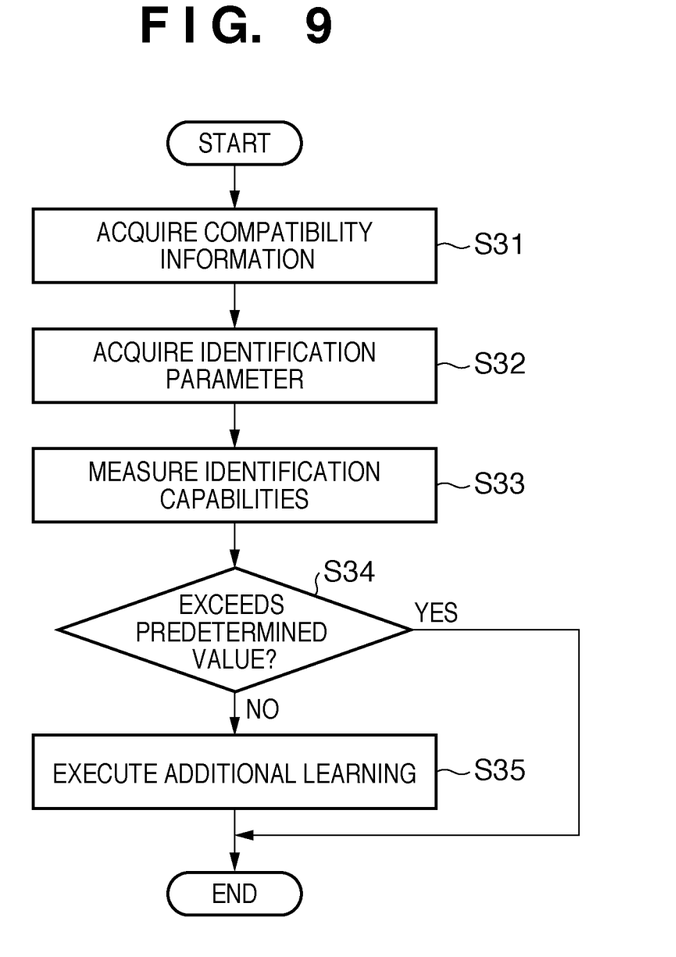
FIG. 9 is a flowchart illustrating an example of an identification parameter sharing process according to the second embodiment.

First, the identification parameter resetting unit 43 acquires the compatibility information of the identification parameters from the compatibility information holding unit 142 (S31). Next, the identification parameter resetting unit 43 acquires identification parameters that can be shared from the external data based on the acquired compatibility information (S32). Then, the identification parameter resetting unit 43 measures the identification capabilities based on the identification parameters acquired in S32 (S33). At this time, default values are set for the identification parameters that could not be acquired from the external data due to the incompatibility relationship (that is, the missing parameters). Meanwhile, for the identification capabilities, the identification rate may be measured using the registration data as evaluation data. Next, the identification parameter resetting unit 43 determines whether the measured identification capabilities exceed a predetermined value (S34). In the case where the measured identification capabilities exceed the predetermined value (Yes in S34), the process ends. However, in the case where the measured identification capabilities do not exceed the predetermined value (No in S34), the identification parameter resetting unit 43 causes the learning unit 34 to execute additional learning (S35). The additional learning may be continued until the predetermined value is exceeded while, for example, changing the initial value, but because there are also cases where the additional learning will not come to an end, a limitation may be set so that the number of instances of learning does not exceed a predetermined number. Note that in the case where there is absolutely no compatibility in the identification parameters acquired from the exterior, in essence, only the registration data is added, the identification parameters take on the default values, and the additional learning is carried out.

As described thus far, according to the second embodiment, it is possible to share, to the greatest extent possible and even among devices whose identification methods differ, parameters for which additional learning has been carried out in order to identify the registration data.

Although whether or not to execute the additional learning was determined in accordance with an evaluation of the identification rate in the above example, it should be noted that the present invention is not limited thereto. Additional learning of the identification parameters may be carried out each time new registration data is held. Alternatively, necessity information indicating whether or not the execution of additional learning is necessary may be included in the compatibility information of the identification parameters, and the determination as to whether or not to carry out the additional learning may be performed in accordance therewith. For example, in FIG. 8B, when identification parameters that are registered to a device whose device type is "camera A" are registered in a device whose device type is "server", the learning unit 34 is caused to execute the additional learning if a flag indicating additional learning is set. At this time, if there is compatibility in the learning algorithms, the parameters to be shared can be set to the initial values of the additional learning. Typically, the location of local features, the number of local features, and so on can be employed as such initial values of additional learning.

As described thus far, according to the second embodiment, it is possible to suppress the indiscriminate execution of time-consuming additional learning by carrying out the additional learning only in the case where predetermined conditions are met after the registration data identification parameters have been shared. Therefore, according to the second embodiment, registration data and parameters for identifying registration data through an identification method that is unique to a device can be shared among multiple devices, thus making it possible to unify the identification capabilities and realize a reduction in the additional learning time.

The present invention can be applied in image sensing apparatuses such as digital cameras, camcorders, network cameras, and so on. The present invention can also be applied in PCs, mobile devices, and other such integrated applications.

Embodiments of the present invention have been described in detail above, but the present invention can take the form of a system, apparatus, method, program, storage medium, and so on. Specifically, the present invention may be applied to a system configured of multiple devices or to an apparatus configured of a single device.

According to the aforementioned embodiments, it is possible to share additional learning results with other devices and thus achieve a reduction in the effort and time required for the additional learning.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-007445, filed Jan. 15, 2010, which is hereby incorporated by reference herein in its entirety.

What is claimed is:
1. A pattern identification apparatus that identifies a pattern that exists in input data using registration data that includes data of a reference pattern or a feature amount thereof and identification parameters that define processing details for comparing the input data with the registration data, the apparatus comprising:
- a holding unit configured to hold the registration data and the identification parameters in association with a label;
- an acquisition unit configured to acquire external data that includes registration data from an external apparatus;
- a first determination unit configured to determine whether registration data which has the same label as acquired by the acquisition unit are already held in the holding unit;
- a second determination unit configured to determine whether the external data further includes identification parameters which are different from the identification parameters held in the holding unit in association with the same label as acquired by the acquisition unit if it is determined that the registration data which has the same label are already held in the holding unit;
- an adding unit configured to add the registration data and identification parameters acquired by the acquisition unit to the holding unit in association with the label acquired by the acquisition unit if it is determined that the external data further includes different identification parameters;
- selection unit configured to select, if it is determined that different identification parameters are already held in the holding unit in association with the same label, one of the identification parameters acquired by the acquisition unit and the identification parameters held in the holding unit in association with the same label; and
- an update unit configured to update the held identification parameters with the acquired identification parameters and to add the acquired registration data together with the acquired identification parameters, if the acquired identification parameters are selected by the selection unit, and to add the acquired registration data together with the held identification parameters, if the held identification parameters are selected by the selection unit,
- wherein at least one processor functions as at least one of the units.

2. The apparatus according to claim 1,
wherein in the case where registration data and identification parameters associated with the same label as acquired by the acquisition unit are already held in the holding unit, the adding unit evaluates an identification rate for the identification parameters acquired by the acquisition unit and the identification parameters held in the holding unit in association with the same label, respectively, and selects the identification parameters having the higher identification rate.

3. The apparatus according to claim 1, wherein in the case where registration data and identification parameters associated with the same label as acquired by the acquisition unit are already held in the holding unit, the adding unit selects the identification parameters having the newer generation time from the identification parameters acquired by the acquisition unit and the identification parameters held in the holding unit in association with the same label.

4. The apparatus according to claim 1,
wherein the input data is image data.

5. A control method for a pattern identification apparatus that identifies a pattern that exists in input data using registration data that includes data of a reference pattern or a feature amount thereof and identification parameters that define processing details for comparing the input data with the registration data, the method comprising:
- holding the registration data and the identification parameters in association with a label in a holding unit;
- acquiring external data that includes registration data, and a label from an external apparatus;
- determining whether registration data which has the same label as acquired by the acquiring step are already held in the holding unit;
- determining whether the external data further includes identification parameters which are different from the identification parameters held in the holding unit in association with the same label as acquired by the acquisition step if it is determined that the registration data which has the same label are already held in the holding unit;
- adding the registration data and identification parameters acquired in the step of acquiring to the holding unit in association with the label acquired in the step of acquiring, if it is determined that the external data further includes different identification parameters;
- selecting, if it is determined that different identification parameters are already held in the holding unit in association with the same label, one of the identification parameters acquired in the step of acquiring and the identification parameters held in the holding unit in association with the same label; and
- updating the held identification parameters with the acquired identification parameters and adding the acquired registration data together with the acquired identification parameters, if the acquired identification parameters are selected by the selection step, and adding the acquired registration data together with the held identification parameters, if the held identification parameters are selected by the selection step.

6. A non-transitory computer-readable storage medium on which is stored a program for causing a computer to execute a control method for a pattern identification apparatus that identifies a pattern that exists in input data using registration data that includes data of a reference pattern or a feature amount thereof and identification parameters that define processing details for comparing the input data with the registration data, the method comprising:
- holding the registration data and the identification parameters in association with a label in a holding unit;
- acquiring external data that includes registration data and a label from an external apparatus;
- determining whether registration data which has the same label as acquired by the acquiring step are already held in the holding unit;
- determining whether the external data further includes identification parameters which are different from the identification parameters held in the holding unit in association with the same label as acquired by the acquisition step if it is determined that the registration data which has the same label are already held in the holding unit;
- adding the registration data and identification parameters acquired in the step of acquiring to the holding unit in association with the label acquired in the step of acquiring, if it is determined that the external data further includes different identification parameters;
- selecting, if it is determined that different identification parameters are already held in the holding unit in association with the same label, one of the identification parameters acquired in the step of acquiring and the identification parameters held in the holding unit in association with the same label; and
- updating the held identification parameters with the acquired identification parameters and adding the acquired registration data together with the acquired identification parameters, if the acquired identification parameters are selected by the selection step, and adding the acquired registration data together with the held identification parameters, if the held identification parameters are selected by the selection step.

\* \* \* \* \*